United States Patent Office 3,028,414
Patented Apr. 3, 1962

3,028,414
PREPARATION OF ESTERS
Newman M. Bortnick, Oreland, and Gerard E. Gantert, Philadelphia, Pa., assignors to Rohm & Haas Company, Philadelphia, Pa., a corporation of Delaware
No Drawing. Filed July 29, 1958, Ser. No. 751,616
10 Claims. (Cl. 260—465.4)

This invention deals with a method for the preparation of specific cyanoesters. It further deals with specific cyanoesters as new compositions of matter.

This invention deals with compounds having the formula

I
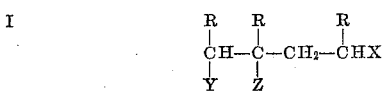

in which R is a hydrogen atom or a methyl group, X and Y represent a cyano group or an alkyl ester group in which the alkyl portion contains from one to eighteen carbon atoms, and Z stands for an alkyl ester group in which the alkyl portion contains from one to eighteen carbon atoms. The total number of carbon atoms in the compound must not exceed thirty-six.

X or Y may typically represent the cyano group, methoxycarbonyl, ethoxycarbonyl, butoxycarbonyl, pentoxycarbonyl, octoxycarbonyl, decoxycarbonyl, dodecoxycarbonyl, tetradecoxycarbonyl, or octadecoxycarbonyl groups. The symbol Z may typically represent the alkoxycarbonyl groups mentioned heretofore under the definition of X and F. The alkyl portion of the above-mentioned alkoxycarbonyl groups may represent any of the known spatial configurations, such as normal, iso, tertiary, and the like. As far as the products are concerned, at least one of the groups X and Y must represent a cyano group. It is preferred that Y represent the cyano group. It is advantageous that X and Y both represent cyano groups. With regard to the present process, both of the above restrictions on X and Y are preferred, but generally X and Y can also be ester groups.

The method of this invention concerns the reaction between a compound having the formula II
$$CH_2=\overset{R}{\underset{|}{C}}-X$$

with one having the formula

III

to form the product identified as Formula I heretofore. The symbols R, X, Y, and Z have the significance given to them previously.

The present invention is conducted in the temperature range of 70° to 250° C., preferably 80° to 175° C. It is desirable to conduct the reaction at the reflux temperature of the reaction medium because the reactants boil at a lower temperature than the products and, therefore, the reflux temperature will rise in a way that indicates that the reaction is being consummated. Accordingly, the reaction generally is conducted until an upper reflux temperature is observed. The significance of this will be apparent to one skilled in the art.

The reaction occurs in a substantially equimolecular manner. However, it is desirable to have the saturated reactant present in at least equimolecular amounts and most advantageously in some cases up to about a 5 to 1 ratio of the saturated to the unsaturated reactant. The excess of the saturated reactant assures highest yields. Greater excesses of saturated to unsaturated component are not advantageous since yields are not increased and separation of the product becomes more time-consuming and expensive.

A solvent is not required, but if such is desired, then one may use a volatile inert organic agent, such as tertiary alcohols.

The reaction is conducted preferably at atmospheric pressure but higher pressures may be employed, if desired.

A catalyst is required to effect the present reaction. While any basic catalyst can achieve the desired results, one preferably employs a base which reacts only slowly or not at all with ester groups under the conditions of the present reaction. Thus, preferred basic catalysts may be said to be ester-resistant bases. If strong bases generally are employed, there is a tendency for these agents to react with the ester groups of the reactants causing destruction of the catalyst and minimization of the formation of the desired product. If weak bases of a highly sterically hindered structure are employed, then low yields of product are observed, because reaction rates are very low. Therefore, it is desirable to employ weak to moderate bases that exhibit low steric hindrance or strong bases that exhibit high steric hindrance. It is in this sense that the term, ester-resistant base, is employed, as will be understood by those skilled in the art. As an example of the catalyst definition, a weak base with low steric hindrance may be represented by 1,4-diazabicyclo[2.2.1]octane, which has the formula

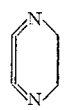

As an illustration of a strong base exhibiting high steric hindrance, one may use potassium tert-butoxide, which has the formula

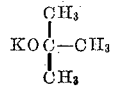

Typical catalysts that may be employed include alkali metal carbonates, such as potassium carbonate, alkali metal lower alkoxides, such as potassium tert-butoxide, tertiary amines, such as tributylamine, heterocyclic bases that have no hydrogen atoms on the nitrogen atoms thereof, such as 1,4-diazabicyclo[2.2.1]octane and 2,3-dihydro - 5,7,7 - trimethyl - (7H) - imidazo(1,2–a)pyrrole, alkaline earth oxides, such as cadmium oxide, alkaline earth hydroxides, such as barium hydroxide, alkali metal hydrides, such as sodium hydride, and the like. Likewise, quaternary ammonium carbonates, alkoxides, and hydroxides may be employed, such as tetramethylammonium methoxide, benzyltrimethylammonium hydroxide, dibenzyldimethylammonium carbonate, and the like. Of the above catalysts, sodium hydride, sodium methoxide, and benzyltrimethylammonium hydroxide produce lower yields of the desired product because they are strong and sterically unhindered as has been discussed hereinbefore.

At the conclusion of the reaction, the products are readily separated by distillation since there is always a sufficient difference in boiling point between the product and the reactants.

Typical reactants of formula II that may be employed include acrylonitrile, methacrylonitrile, methyl acrylate, ethyl acrylate, butyl acrylate, octyl acrylate, decyl acrylate, dodecyl acrylate, tetradecyl acrylate, octadecyl acrylate, methyl methacrylate, ethyl methacrylate, butyl methacrylate, octyl methacrylate, decyl methacrylate, dodecyl methacrylate, tetradecyl methacrylate, and octadecyl methacrylate.

Typical reactants corresponding to Formula III include methyl β-cyanopropionate, ethyl β-cyanopropionate, octyl β-cyanopropionate, dodecyl β-cyanopropionate, octadecyl β-cyanopropionate, dimethyl succinate, diethyl succinate, dibutyl succinate, dioctyl succinate, didecyl succinate, methyl β-cyanoisobutyrate, ethyl β-cyanoisobutyrate, propyl β-cyanoisobutyrate, butyl β-cyanoisobutyrate, pentyl β-cyanoisobutyrate, octyl β-cyanoisobutyrate, dodecyl β-cyanoisobutyrate, octadecyl β-cyanoisobutyrate, methyl 3-cyano-2,3-dimethylpropionate, ethyl 3-cyano-2,3-dimethylpropionate, butyl 3-cyano-2,3-dimethylpropionate, hexyl 3-cyano-2,3-dimethylpropionate, nonyl 3-cyano-2,3-dimethylpropionate, hexadecyl 3-cyano-2,3-dimethylpropionate, succinonitrile, 2-methylsuccinonitrile, and 2,3-dimethylsuccinonitrile.

If it is desired to obtain esters of this invention other than the methyl or ethyl representations, it is both possible and preferred to make the methyl or ethyl members and then obtain any other desired products by transesterification. The transesterification is conducted in the presence of a strongly acidic esterifying catalyst, such as sulfuric acid, a lower alkanesulfonic acid including butanesulfonic acid, or an arenesulfonic acid including p-toluenesulfonic acid, and the like, or a strongly alkaline esterifying catalyst, such as sodium methoxide. It is, also, possible to employ a strong acid ion-exchange resin, such as a sulfonated polystyrene or a sulfonated phenol-formaldehyde resin the acid form.

The transesterification is preferably conducted at the reflux temperature of the reaction mixture which is usually in the range of about 100° to 275° C., preferably about 150° to 225° C. If desired, small amounts of a volatile inert organic solvent, such as toluene, xylene, or the like, may be used to help regulate the reflux temperature. Methyl or ethyl alcohol, as the case may be, is distilled off as the transesterification progresses and the reaction is continued until the theoretical amount of alcohol is collected. At the conclusion of the transesterification, the product is isolated, such as by neutralizing the catalyst, filtering, and distilling, preferably under reduced pressure. The products of this invention are valuable plasticizers, particularly for polyvinyl chloride and are useful intermediates for carboxyanhydride and polyester syntheses. Especially valuable are the products in which X or Y represent the cyano group and especially advantageous are those compounds in which X and Y both represent cyano groups. These two narrow categories exhibit particularly advantageous properties not found in the remainder of the products made by the present method and they are, therefore, distinct in this respect. As a plasticizer, for example, one may employ a mixture of one of the products of this invention in which X or Y, or both, represent the cyano group, in the amount of 40 parts, 60 parts of polyvinyl chloride, 1 part of tribasic lead sulfate, and 0.5 part of stearic acid. This mixture is milled for seven minutes at 325° F. to give a flexible film of good toughness and durability.

The compounds of this invention, as well as the method for their preparation, may be more fully understood from the following examples which are offered by way of illustration and not by way of limitation. Parts by weight are used throughout.

Example 1

A mixture of methyl acrylate (86 parts) methyl β-cyanopropionate (399 parts), potassium carbonate (2.8 parts), and hydroquinone (1 part) is boiled under reflux for six hours. At that time, an additional portion of potassium carbonate (2.8 parts) is added and refluxing is resumed for 18 hours. The reaction mixture is filtered and the filtrate is distilled under reduced pressure. The product, B.P. 131°–140° C. (2.5 mm.), has $n_D^{25}$ 1.4471 and is shown to be dimethyl 2-cyanomethylglutarate by elemental analysis and inspection of the ultraviolet absorption spectrum. The product contains 55.56% carbon (54.21% theoretical), 6.67% hydrogen (6.58% theoretical), 6.97% nitrogen (7.03% theoretical), and has a saponification number of 563 (563 theoretical).

Example 2

A mixture of methyl β-cyanopropionate (339 parts), acrylonitrile (53 parts), hydroquinone (1 part), and potassium carbonate (2.8 parts) is boiled under reflux for six hours. At that time, potassium carbonate (2.8 parts) is added and refluxing is continued for a total of 25 hours. The reaction mixture is cooled and the precipitate is separated by filtration. The filtrate is distilled under reduced pressure. Unchanged acrylonitrile is recovered by means of a dry ice-cooled trap. The product, 3-methoxycarbonyladiponitrile, has B.P. 151°–157° C. (3.0 mm.), and $n_D^{25}$ 1.4595.

In a similar manner, octyl β-cyanopropionate is reacted with methacrylonitrile and butyl methacrylate is reacted with methyl 3-cyano-2,3-dimethypropionate to form desired products of this invention.

Example 3

A mixture of methyl β-cyanopropionate (339 parts), acrylonitrile (53 parts), sodium hydride (0.48 part) and hydroquinone (1.0 part) is combined at −20° C. The temperature is allowed to rise slowly to room temperature. The mixture is stirred for five hours at room temperature and then is allowed to stand overnight. Methanol (20 parts) is added, the reaction mixture is filtered and washed with water (500 parts), and the organic layer is dried over sodium sulfate and filtered. The filtrate is distilled under reduced pressure. Unreacted methyl β-cyanopropionate is recovered in the forerun cut. The product cut has a B.P. 151°–193° C. (2.0 mm.), and $n_D^{25}$ 1.4577. When nine times as much sodium hydride is employed and the reaction mixture is heated to 90° C. over a two hour period, an exothermic reaction ensues, which carries the temperature to 124° C. At this point, control is achieved by means of ice-water cooling. The reaction mixture is filtered, washed, dried, and distilled under reduced pressure. Unreacted methyl β-cyanopropionate and the desired product, B.P. 150°–175° C. (0.5–1.5 mm.) and $n_D^{25}$ 1.4572, are obtained.

Example 4

Diethyl succinate (523 parts), acrylonitrile (53 parts), and potassium carbonate (2.8 parts) are boiled under reflux for five hours. At this point, an additional amount of potassium carbonate (2.8 parts) is added and the reaction mixture is refluxed for a total of 23 hours. The reaction mixture is filtered and the filtrate is washed with 1 liter of water. The organic layer is distilled under reduced pressure and gives the desired product, diethyl 2-(2-cyanoethyl)-succinate, B.P. 130°–137° C. (2.0 mm.), $n_D^{25}$ 1.4350.

In like manner, there are reacted 2,3-dimethylsuccinonitrile with octadecyl acrylate and succinonitrile with dodecyl methacrylate to form products of this invention.

Example 5

Methyl β-cyanopropionate (339 parts), acrylonitrile (53 parts), and tri-n-butylamine (37 parts) are boiled under reflux for 20 hours. After eight hours of boiling, the pot temperature rises from 129° to 145° C. and refluxing ceases. The reaction mixture is distilled under reduced pressure. Redistillation under reduced pressure gives the desired product, 3-methoxycarbonyladiponitrile, B.P. 130°–145° C. (1.0 mm.)

Example 6

A mixture of methyl β-cyanopropionate (339 parts), acrylonitrile (53 parts) and a 15% solution of potassium tert-butoxide in tert-butanol (20 parts by volume) is boiled under reflux. The pot temperature remains at 118°–121° C. during the entire course of the run. After one hour of boiling, ten 2 cc. portions of catalyst are added at 30 minute intervals. When the addition is complete, the reaction mixture is boiled for an additional sixteen hours. The reaction mixture is washed several times with water and then the organic layer is distilled under reduced pressure. The product, 3-methoxycarbonyladiponitrile, has B. 150°–185° C. (1.0 mm.) and $n_D^{25}$ 1.4550.

Example 7

A mixture of methyl β-cyanopropionate (339 parts), methyl acrylate (86 parts), hydroquinone (1 part), and tri-n-butylamine (37 parts) is boiled under reflux for 24 hours. The pot temperature rises to 135° C. at the end of this time. Heating is continued for an additional 24 hour period. The pot temperature rises to 156° C. before heating is terminated. The reaction mixture is washed with cold water and the wet product is distilled under reduced pressure. The product, dimethyl 2-cyanomethylglutarate, 66 parts, has B.P. 125°–153° C. (0.7 mm.) and $n_D^{25}$ 1.4470. In addition, a product, B.P. 206°–210° C. (1.0 mm.) and $n_D^{25}$ 1.4700, is obtained. While the structure of the high-boiling product is not known with certainty, elemental analysis shows the empirical formula to be $C_{13}H_{19}O_5N$, a product derived from the addition of dimethyl 2-cyanomethylglutarate to methyl acrylate. One possible structure for this material is dimethyl 2-cyanomethyl-4-methoxycarbonylpimelate. A possible alternative structure is dimethyl 4-cyanomethyl-4-methoxycarbonylpimelate.

Example 8

A mixture of methyl β-cyanopropionate (339 parts), methyl acrylate (86 parts), hydroquinone (1.0 part), and 2,3-dihydro-5,7,7,-trimethyl-(7H)-imidago(1,2–a)-pyrrole (7.5 parts) is boiled under reflux for 48 hours. The reaction mixture is washed with 1000 parts of water. The crude wet product is distilled under reduced pressure. Again, two products are obtained; dimethyl 2-cyanomethylglutarate (42 parts), B.P. 120°–150° C. (0.5 mm.) and $n_D^{25}$ 1.4469, and dimethyl 2(or 4)-cyanomethyl-4-methoxycarbonylpimelate (4.5 parts), B.P. 150°–190° C. (0.5 mm.) and $n_D^{25}$ 1.4753.

In a similar way, butyl acrylate is reacted with dodecyl β-cyanopropionate and octyl methacrylate is reacted with dioctyl succinate to form products of this invention.

Example 9

A mixture of methyl β-cyanopropionate (339 parts), methyl acrylate (86 parts), hydroquinone (1 part), and 1,4-diazabicyclo[2.2.2]octane (11.2 parts) is mixed together and heated by means of an oil bath. After ¾ of an hour, the temperature rises to 146° C. in the reactor. At this point, the reaction mixture is distilled under reduced pressure. Cut 1 (294 parts) has B.P. 62°–115° C. (0.5–0.9 mm.) and comprises methyl β-cyanopropionate. Cut 2 (79 parts) has B.P. 115°–210° (0.9–7.0 mm.) and contains the two reaction products. Redistillation under reduced pressure gives pure dimethyl 2-cyanomethylglutarate, 66 parts, and a mixture, B.P. 142°–185° C. (0.4–1.0 mm.), 10 parts, of the di- and tri-ester. The yield of product in the main cut is 84% based on methyl β-cyanopropionate which has been consumed.

Example 10

A mixture of methyl β-cyanoisobutyrate (381 parts), methyl acrylate (86 parts), hydroquinone (1 part), and 1,4-diazabicyclo[2.2.2]octane (11.2 parts) is boiled under reflux for 20 hours. The reaction mixture is distilled under reduced pressure to give recovered methyl β-cyanoisobutyrate (321 parts), the main product, dimethyl 2-methyl-2-cyanomethylglutarate (or the isomeric structure, dimethyl 2-methyl-3-cyanoadipate), B.P. 114°–116° C. (0.55 mm.) and $n_D^{25}$ 1.4502 (52 parts), and a high boiling cut obtained from the addition of methyl acrylate to dimethyl 2-methyl-2-cyanomethylglutarate, B.P. 150°–192° C. (0.5 mm.) (12 parts).

Example 11

A mixture of methyl β-cyanopropionate (339 parts), methyl methacrylate (100 parts), hydroquinone (1.0 part), and 1,4-diazabicyclo[2.2.2]octane (11.2 parts) is boiled under reflux for 20 hours. The mixture is distilled under reduced pressure to give recovered methyl β-cyanopropionate and the product, dimethyl 2-cyanomethyl-4-methylglutarate, B.P. 130°–145° C. (0.5 mm.) and $n_D^{25}$ 1.4619.

We claim:

1. A method for the preparation of a compound having the formula

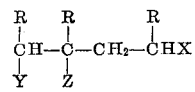

containing no more than thirty-six carbon atoms, which comprises bringing together

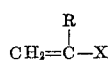

with

at a reacting temperature in the range of 70° to 250° C. in the presence of a basic catalyst, in which R is a member of the class consisting of a hydrogen atom and a methyl group, X is a member of the class consisting of a cyano group and an alkoxycarbonyl group in which the alkyl portion contains from one to eighteen carbon atoms, Y is a member of the class consisting of a cyano group and an alkoxycarbonyl group in which the alkyl portion contains from one to eighteen carbon atoms, and Z is an alkoxycarbonyl group in which the alkyl portion contains from one to eighteen carbon atoms.

2. A method according to claim 1 in which the reaction is conducted at the reflux temperature of the reaction medium.

3. A method according to claim 1 in which the reaction temperature range is 80° to 175° C.

4. A method according to claim 2 in which at least one of X and Y represents a cyano group.

5. A method according to claim 2 in which the reaction is conducted in the presence of a volatile inert organic solvent and the saturated reactant is present in excess.

6. A method for the preparation of dimethyl 2-cyanomethylglutarate which comprises reacting methyl acrylate and methyl β-cyanopropionate in the temperature range of about 80° to 175° C. in the presence of a basic catalyst.

7. A method for the preparation of 3-methoxycarbonyladiponitrile which comprises reacting acrylonitrile and methyl β-cyanopropionate in the temperature range of about 80° to 175° C. in the presence of a basic catalyst.

8. A method for the preparation of diethyl 2-(2-cyanoethyl)-succinate which comprises reacting acrylonitrile and diethyl succinate in the temperature range of about 80° to 175° C. in the presence of a basic catalyst.

9. A method for the preparation of dimethyl 2-methyl-2-cyanomethylglutarate which comprises reacting methyl acrylate and methyl β-cyanoisobutyrate in the temperature range of about 80° to 175° C. in the presence of a basic catalyst.

10. A method for the preparation of dimethyl 2-cyanomethyl-4-methylglutarate which comprises reacting methyl methacrylate and methyl β-cyanopropionate in the temperature range of about 80° to 175° C. in the presence of a basic catalyst.

References Cited in the file of this patent
UNITED STATES PATENTS 2,396,626    Wiest et al. _____ Mar. 12, 1956

OTHER REFERENCES

Beilstein's Handbuch der Organischen Chemie, volume II, 1920, p. 820 and 829, volume II (1st supplement), 1929, p. 324, volume II (2nd supplement), 1942, p. 684.

Floyd et al.: Journal of Organic Chemistry, vol. 16, June 1951, pages 882–886.

Riddle: "Monomeric Acrylic Esters," Reinhold Publishing Corp., N.Y., 1954, p. 184.